(12) United States Patent
Bauer et al.

(10) Patent No.: US 9,074,697 B2
(45) Date of Patent: Jul. 7, 2015

(54) CASTING MACHINE VALVE

(75) Inventors: Bernhard Bauer, Oberuzwil (CH); Leo Bühler, Wädenswil (CH)

(73) Assignee: Buehler AG, Uzwil (CH)

( * ) Notice: Subject to any disclaimer, the term of this patent is extended or adjusted under 35 U.S.C. 154(b) by 0 days.

(21) Appl. No.: 13/981,316

(22) PCT Filed: Jan. 25, 2012

(86) PCT No.: PCT/EP2012/051102
§ 371 (c)(1),
(2), (4) Date: Aug. 13, 2013

(87) PCT Pub. No.: WO2012/101154
PCT Pub. Date: Aug. 2, 2012

(65) Prior Publication Data
US 2013/0316034 A1    Nov. 28, 2013

(30) Foreign Application Priority Data
Jan. 25, 2011  (EP) ..................... 11151949

(51) Int. Cl.
*B29C 39/44* (2006.01)
*B29C 39/24* (2006.01)
*F16K 15/14* (2006.01)
(Continued)

(52) U.S. Cl.
CPC ......... *F16K 15/144* (2013.01); *Y10T 29/49412* (2015.01); *Y10T 29/49407* (2015.01); *F16K 15/145* (2013.01); *B05B 1/046* (2013.01); *B05B 11/007* (2013.01); *B29C 39/24* (2013.01); *F16K 15/147* (2013.01); *A23G 1/206* (2013.01); *B05B 1/02* (2013.01); *B05B 1/044* (2013.01); *B05B 1/3006* (2013.01); *B23P 15/001* (2013.01); *B29C 39/44* (2013.01)

(58) Field of Classification Search
CPC ........ A23G 1/206; B05B 1/044; B05B 1/046; B05B 11/007; F16K 15/144; F16K 15/145; F16K 15/147; B29C 39/24
USPC ...................... 29/890.121, 890.124, 890.125; 137/15.17, 15.18, 15.19, 843, 852, 137/855; 425/146
See application file for complete search history.

(56) References Cited

U.S. PATENT DOCUMENTS 5,620,032 A * 4/1997 Dame ........................ 141/311 A
2010/0291269 A1* 11/2010 Ouriev ......................... 426/231
(Continued)

FOREIGN PATENT DOCUMENTS

| DE | 102008043604 | 5/2010 |
| EP | 1350477 | 10/2003 |
| WO | 2009/032647 | 3/2009 |
| WO | WO 2009130178 A2 * | 10/2009 |
| WO | WO 2010066910 A1 * | 6/2010 |

*Primary Examiner* — Joseph S Del Sole
*Assistant Examiner* — Lawrence D Hohenbrink, Jr.
(74) *Attorney, Agent, or Firm* — Davis & Bujold, P.L.L.C.; Michael J. Bujold

(57) ABSTRACT

The invention relates to a valve flap (1) for producing a casting machine valve (100), in particular for installing into a casting machine for casting a flowable substance, in particular a liquid substance with suspended solid particles, such as chocolate for example, in which cocoa particles and sugar particles are typically suspended in a molten fatty substance that has cocoa butter and milk fat to a greater or lesser extent. The valve flap is designed such that a valve can be produced with at least one other valve element, said valve consisting in particular of at least two valve flaps (1) that are preferably identical.

24 Claims, 13 Drawing Sheets

(51) Int. Cl.
*A23G 1/20* (2006.01)
*B05B 1/02* (2006.01)
*B05B 1/30* (2006.01)
*B23P 15/00* (2006.01)
*B05B 1/04* (2006.01)
*B05B 11/00* (2006.01)

(56) References Cited

U.S. PATENT DOCUMENTS

2011/0036432 A1* 2/2011 Ouriev .......................... 137/843
2011/0241332 A1* 10/2011 Boden et al. .................... 285/23
2011/0315024 A1 12/2011 Ouriev et al.

* cited by examiner

CASTING MACHINE VALVE

BACKGROUND OF THE INVENTION

The invention relates to a valve flap for forming a valve, in particular for a casting machine, to a valve, and to a valve system, in particular for installation in a casting machine for casting a flowable mass, and to a casting machine for casting a flowable mass, in particular a liquid mass containing suspended solid particles, such as chocolate. The invention further relates to a casting machine, to a method for forming a valve system, to a method for adapting a casting machine valve system, to an assembly kit for forming a casting machine valve system, and to a method for converting a casting machine.

Known casting machines for the casting of chocolate contain, for example, a mass tank for receiving flowable mass, at least one valve, which is fluidically connected to the interior of the mass tank, wherein the valve, given the presence of a pressure gradient along its valve passage direction, is in an open state and, given the non-presence of this pressure gradient along its valve passage direction, is in a closed state; as well as a pressure generating means for generating a pressure gradient along the valve passage direction of the valve.

In this context, flowable masses are masses which either flow by themselves due to gravitational force and/or which are conveyable by means of a pump.

The pressure can be generated, for instance, by means of a piston device, with which portioned volumes of the mass are pulled or pushed into metering chambers and are pressed or poured out of these same through nozzles onto a support or into hollow molds.

In some particular models of casting machines of this type, the valve function is coupled with the piston function. For this, the piston is configured, for example, as a substantially cylindrical reciprocating and/or rotary piston, wherein, through a succession of reciprocating and/or rotary motions of the respective piston in a first direction and an opposite second direction, a full casting cycle (induction and expulsion) can be performed.

In most applications in which chocolate mass is cast, the casting takes place at such high temperatures that the chocolate mass as a whole is present in a really highly fluid state and an afterflow at the nozzles can ensue.

It has therefore proved advantageous to use nozzle flaps which are articulately connected to the valve body and are subjected to an elastic pretensioning which forces the valve flap against the valve opening and seals this off.

Valves having elastic valve flaps can also be used. For instance, valves whose valve flaps are shaped by the regions between slot-like openings in a valve body are known. As the slots are being cut, the valve structure can, however, be undefinedly damaged, whereby the working of the sealing surfaces can be impaired. The rims of the slots are inclined to crack under stress, whereby the working life, in the present case the number of possible closing cycles, is reduced.

Moreover, it has proved difficult in practice to furnish the valve flaps in a slotted valve body with a defined pretensioning.

Valves of this type therefore frequently fail to meet the requirements with regard to precise metering, particularly in the case of high clock frequencies and small metering quantities.

SUMMARY OF THE INVENTION

The object of the invention is to provide a valve flap for a valve, a valve, a valve system, and a casting machine for producing a consumable product from a castable mass, in particular from fatty mass such as, for example, chocolate, in which the portrayed drawbacks and deficiencies in the casting can be avoided or at least diminished. At the same time, the casting machine valve and the casting machine are intended to have a simple and robust construction.

This object is achieved by a valve flap as described below. The valve flap is designed such that, with at least one further valve element, a valve can be formed. The valve element can be constituted by a similar and/or a complementary element to the valve flap. While the valve flap is generally an at least partially movable valve element, the further valve element can be a static element offering, for instance, a stop face or a seat for the valve flap. Preferably, however, it is a further, preferably similar, valve flap.

Preferably, a plurality of valve flaps, in particular two, three or four valve flaps, can be put together to form a valve.

The valve flaps or valve flap and valve element are preferably arranged in the valve such that, in a flap setting, preferably in a rest position, in which no pressure is applied to the flaps, they block the valve opening. As soon as a pressure is applied to a flap, the flap leaves the rest position and the valve offers a passage. If the pressure abates again, then the valve flaps reclose.

The valve flap is preferably designed such that four valve flaps can be put together to form a valve having a preferably circular inflow opening.

Individually existing and/or produced valve flaps offer the prospect of unrestricted design. They can be produced, for example, in separate forms, for instance can be cast, pressed, foamed or vulcanized, so that, in respect of the shaping, the spatial requirement of adjacent valve elements can be disregarded.

The valve flaps can also be produced cohesively. They can be separated after the forming and/or formed cohesively in such a way that they can also be cohesively joined to form a valve. Inventive valve flaps can be produced, at least in the region of the valve opening, regardless of the opening range of another valve flap.

The inventive valve flap preferably consists of, or at least contains, an elastomer material. The valve flap can then change its shape under pressure and thereby free the valve opening. For the opening and closing of the valve, no movement of a whole valve element, or of the entire valve flap, is therefore necessary, but only a deformation. The opening and closing operation can be realized correspondingly quickly.

The inventive valve flap preferably consists of a material which can be detected in a metal detector. Particularly preferably, it is a metal detectable elastomer material. In the manufacture of the valve flaps, a powder which is detectable in a metal detector, for instance iron oxide particles, is added to the elastomer parent mass.

The mass which is cast with the valve can therefore be checked in a metal detector for remnants of possibly defective valves. This is done for food safety purposes.

A valve flap comprises at least one flap region. The flap region defines the opening of the valve.

A valve flap preferably further comprises a neck region. Advantageously, the neck region is of rather stiff configuration and the flap region is rather flexible. To this end, the material thickness of the valve flap can be greater in the neck region than in the flap region. The neck region can also be reinforced by another structural part of the valve. To this end, the neck region can be designed such that it interacts with the further structural part, for instance offers a bearing surface. The neck region can thus be realized such that the neck regions of valve flaps form, in the mounted state, a flange by which the valve can be connected to an adapter. The neck can also be of shortened construction, so that it consists merely of a connecting element to the adapter, for instance the neck region forms, in the mounted state, an annular groove.

In an advantageous embodiment of the invention, the valve flap, in particular in the flap region, is geometrically overdetermined.

Geometric overdetermination means in the present case that the valve flap, in particular the flap region, in the unmounted state covers a larger segment of the cross sectional area of the valve than in the mounted state, or, in the case of a valve made up of similar valve elements, that the sum of the areas which are covered by the valve flaps, in particular the valve regions of individual unmounted valve flaps, is greater than the cross sectional area or opening area of the valve. In valve flaps having a neck and a flap region, the flap region, in the unmounted state, can cover a larger area than is enclosed by the neck region.

This can lead to a situation in which the flap regions of the valve flaps, in the mounted state, overlap or underlap one another. If the edges of the valve flaps, in the flap region, are blunt, however, then the flaps, in the mounted state, with the valve closed, butt against each other and reciprocally apply a pressure. The edges are preferably configured such that they form with the edge of an adjacently disposed valve flap a sealing closure.

The flap region is preferably designed such that the flap region, in the unmounted state, covers an area through which runs the central axis of the valve, which central axis is predefined by the neck region. In a valve which is formed of similar valve flaps, the valves, in the closed state, butt one against the other on this axis. The valve flaps which have been put together to form a valve closure have, in the mounted state, with the valve closed, a pretensioning.

The pretensioning ensures a defined opening and/or closing of the valve flaps and that sealing surfaces at the edges of the valve flaps are pressed one upon another. A sealtight valve closure is thus achieved, including for highly fluid or even gaseous masses.

In a further preferred embodiment of the invention, the valve flap has at least one cutting lip, preferably in the flap region, which in the mounted state, with the valve closed, overlaps or underlaps an adjacent valve element, preferably a further valve flap.

The cutting lip is preferably designed such that the material thickness diminishes with increasing distance from the flap region of the valve flap, i.e. in the outward direction. This ensures that the cutting lip forms a cutting edge with which the material stream of the mass running out of the valve is interrupted in a defined manner when the valve flaps close.

Moreover, the cutting lip, in the mounted state of the valve flap, slides more smoothly over or under the adjacent valve element upon movement of the flap regions. The sealing closure of the valve flaps is thus not hampered by the cutting lips.

With the aid of a cutting lip, the stream of material to be cast is sheared during the closing and prior to a definitive closure of the valve flaps, whereby a thread is torn off.

First a valve flap can be produced, for instance in an injection molding process, and then a cutting lip can be attached, for instance glued on. The cutting lip and the valve flap are preferably, however, realized in one piece, so that the valve flap is produced directly with the cutting lip.

In a further preferred embodiment of the invention, the valve flap is realized at the marginal regions such that it fits, in the mounted state, sealingly onto adjacent valve flaps, in particular in the neck region fits positively onto and/or into adjacent valve flaps.

To this end, the valve flaps can have extensions and/or openings, which, in the mounted state, engage in corresponding extensions and/or openings of adjacent valve elements, in particular of further valve flaps. A sealing fitting together of the valve flaps, in particular in the neck region, prevents mass to be cast from escaping in the marginal region of the valve flaps and ensures that the valve flaps open only in the flap region.

In a further advantageous embodiment of the invention, the valve flap is realized such that the bending force as the flaps are opened is constant and/or the valve flap opens under pressure across the entire width. To this end, the outward facing edges of the valve flap, in particular in the flap region, are preferably reinforced, or the flap region is reinforced in the middle. The reinforcement is preferably realized by an enlargement of the material thickness, for example by a rib, which is disposed, for example, on the outer side of the flap region of the valve flap.

The valve flap then opens under pressure uniformly and reversibly, that is to say the opening area of the valve grows steadily and uniformly, that is to say without sudden leaps. Upon a reduction in pressure, the valve flap reverts into its starting position and, in the mounted state, the valve flap then also recloses the valve spontaneously, i.e. without the application of an external force.

Moreover, in a preferred variant, the flap regions, in the course of the opening and closing, execute such a motion that the mass flowing through the valve is guided in a specific manner. The mass is meant, for instance, not to reach the outer side of the valve. This could possibly lead to dirtying of the valve, to after-dripping and/or to leaks.

The valve flap can thus be realized such that the outflowing mass makes its way out of the nozzle as a smooth jet.

The valve flap can also however be realized such that a mass which flows through the mounted valve flap receives a spin. For instance, the flap, in the course of the opening and closing, can execute a rotary motion and/or a twist, so that a torsion of the outflowing mass ensues. This can be produced by the existence of different material thickness and/or different material properties (e.g. modulus of elasticity) within the valve flap.

In particular, the edges of the valve flap can be designed such that and/or the course of the valve flap contour can be designed such that the outflowing mass receives a spin as it flows through the valve. To this end, the edges and/or the inner sides of the valve flaps (e.g. spirally or helically arranged channels or guide sheets) can, for example, be shaped such that the mass starts rotating as it flows through.

For more highly viscous masses, in particular, it can be favorable for these to receive a spin in order that, following impact in the mold, they are rapidly and evenly distributed in the mold.

A uniform opening and closing of the valve flaps is also aided by the course of the valve flap contour. The course, in particular in the flap region, is designed such that the bending force as the flaps are opened is constant. A sudden flip of the flap regions, which could possibly cause the valve flaps to no longer close without a counterpressure, is intended to be prevented.

The object is further achieved by a valve, in particular for installation in a casting machine, comprising at least one valve flap, which valve flap, in particular in a flap region, is geometrically overdetermined.

The valve preferably comprises a valve flap, as described above, and at least one further valve element, in particular at least one further, preferably similar, further preferably separately produced, valve flap.

The valve closure in a valve of this type is formed by valve elements, which, at least in the flap region, are produced independently of one another and have a geometry which produces a reliable valve closure.

The individual valve flaps can be produced simultaneously and/or cohesively. For the formation of the valve, use is preferably made of separate valve elements, which, in the course of assembly, are brought into a spatial relationship with one another and fixed. The fixing can be releasable or permanent.

The arrangement of separate valve elements allows greater freedom of scope in the arrangement. The valve elements, in particular valve flaps, can, for instance, underlap or overlap and/or be brought into a mutually pretensioned position.

The object is additionally achieved by a valve system having a valve, in particular as described above, which valve system has an adapter and a fastening element. The adapter serves for the connection between the casting machine and the casting machine valve and has a connecting element for the connection, for instance a thread.

The fastening element serves to fix the valve elements one to another and/or to the adapter. The fastening element can be constituted by an adhesive joint, a shrink joint or a weld joint. Preferably, the fastening element is constituted by a coupling nut, a click joint element, a latching element or a clamping element.

The valve system can be realized such that it can be mounted or removed only in the joined together state. To this end, an action zone for an appropriate tool, with the aid of which the joined together valve system can be properly, i.e. without risk of damage, applied, removed, fastened or released, can be provided, for instance, only on the adapter or only on the fastening element.

The fastening element and the adapter can be equipped with an antitwist protection, for instance with, in the mounted state, interlocking grooves and ribs, which preferably run in the axial or passage direction of the valve. These prevent a rotary motion from occurring between the fastening element and the adapter as soon as the fastening element is fitted on the adapter. Rotary forces applied to the fastening element can thus be transmitted to the adapter without any twisting of the valve elements.

A joined together valve system can thus be screwed onto a casting machine, for instance, by means of a tool which acts on the fastening element.

In an advantageous embodiment, the valve flaps are held together by an intermediate ring, in particular a slide ring, which is disposed, in particular, between the valve flaps and the fastening element. The intermediate ring enhances the stability of the valve construction and facilitates mounting. The intermediate ring additionally improves the sealing, so that, especially in the neck region of the valve flaps, no material passes out or in. The intermediate ring can be equipped with an additional seal and/or can have at least one groove for the reception of at least one sealing ring.

The ring preferably consists of a material in which little sliding friction is generated between the fastening element and the ring. During fitting of the fastening element, no forces are therefore transmitted to the slide ring and thus to the valve flaps and, in particular, no twisting of the valve flaps occurs. The arrangement of the valve flaps thus remains unchanged during the fixing.

The intermediate ring can be realized such that it optimizes the pretensioning between the valve elements. It can have, for instance, a conical inner face, which narrows in the direction of the flap region of the valve flaps, applies a concentric pressure to the flaps and thus increases the contact pressure of the flap edges one upon another.

The further the intermediate ring is slid onto the valve flaps, the narrower is the intermediate ring in the flap region and the higher is the effect on the pretensioning. This can thus be increased by the intermediate ring being slid further onto the valve flaps.

The pretensioning is thus adjustable via the seat of the intermediate ring.

The intermediate ring, or slide ring, can be configured as a back-up ring, which encloses the valve flap and limits the motion of the flap regions and prevents, for instance, overarticulation.

The intermediate ring can be configured in one piece with the fastening element, for instance by producing the fastening element and intermediate ring in a multicomponent casting process.

The adapter can have at least one socket made of thermally conductive material, around which the valve flaps, in particular in the neck region, can be arranged.

The material to be cast can thus be temperature controlled until shortly before discharge from the valve. It thus retains a uniform and constant consistency, as well as constant flow characteristics.

The adapter preferably has a cylindrical central opening, which ends in a cylindrical socket. The valve flaps have neck regions with bearing surfaces in the form of cylinder segments, so that the valve flaps can be arranged around and/or in the socket and bear against the latter.

The adapter can have at least one seat for receiving a sealing ring.

The adapter can be permanently fastened to the casting machine, for instance it can be welded on or produced in one piece with a casting machine part, such as, for example, a plunger. Preferably, however, it can be exchangeably fastened. For this purpose, the adapter comprises a fixing element, for instance a flange or a snap locking element, at the end which, in the mounted state, faces the casting machine.

The adapter preferably has a first thread for fastening to the casting machine or to a structural part assigned to the casting machine.

In a further preferred embodiment, the adapter has a second thread for fastening of the fastening element. Alternatively, the adapter can have other fixing elements, which can act as a counterpart and/or can act for the engagement of latching or clamping elements of the fastening element. The adapter can also have a face for an adhesive or welded connection to the fastening element.

In a further preferred embodiment, the adapter has a first thread for fastening to the casting machine or to a structural part assigned to the casting machine, and a second thread for fastening of the fastening element.

The adapter is preferably produced from aluminum.

The object is additionally achieved by a casting machine having a valve as described above.

The inventive valve systems are particularly suitable for use in a metering device of variable volume, which has at least one inlet and one outlet valve. The reliably closing and opening valves increase the metering accuracy.

The object is additionally achieved by a method for forming a valve system as described above, wherein the method comprises the following steps:

(i) arrangement of at least one valve as described above on an adapter, in particular of a valve flap as described above and of a further valve element, in particular of at least one further, preferably similar, valve flap on an adapter; (ii) fixing of the arrangement with a fastening element.

As a further method step, an intermediate ring can be slid onto the valve flaps before the arrangement is fixed with a fastening element.

Alternatively, the fastening element and the intermediate ring can first be connected to each other, so that they can be fixed as a unit.

The valve flaps can also first be connected to the intermediate ring and only then be connected to the fastening element. The fastening elements and valve elements, or valve flaps, then form a unit, which can be fixed to the adapter, for instance screwed onto the adapter.

The object is additionally achieved by a method for adapting a valve into a mass to be cast, comprising the steps (i) selection of suitable valve flaps, and (ii) formation of a valve or valve system as described above.

As further method steps, a release of the fastening element and/or a removal of the valve flaps can previously be undertaken.

With the inventive method, on the one hand used valves can be reconditioned, while on the other hand valves can be adapted to a new use of a casting machine. A casting machine can be used, for example, for a mass having other flow characteristics, so that valves having other closing characteristics are required, the flaps of which valves, for instance, are more easily movable or harder to move or which valves withstand a higher static weight pressure before the pretensioning of the flaps is surmounted and the flaps open.

The object is additionally achieved by an assembly kit for forming a valve system, comprising an adapter, a fastening element and a multiplicity of different valve flaps as described above, so that a valve group which forms a valve suitable for a predefined mass to be cast can be selected from the valve flaps.

Casting machines for different applications can thus be equipped with basically similar casting machine valves. Different closing or passage characteristics of the valves can be achieved by the selection of suitable valve flaps.

The object is additionally achieved by a method for converting a casting machine, comprising the steps: (i) removal of the old casting machine valves; (ii) fitting of casting machine valves as described above.

The object is additionally achieved by a valve system, in particular as described above, wherein the valve system has an adapter and a fastening element. The adapter and the fastening element serve to receive a valve, in particular as described above. According to the invention, an antitwist protection is provided on the adapter and/or on the fastening element, such that the fastening element can no longer be twisted in relation to the adapter as soon as the fastening element is mounted on the adapter.

The fastening element is constituted, in particular, by a coupling nut, a clamping or clip element, the antitwist protection being able to be realized, for instance, by a tongue and groove joint. The fastening element and the adapter can also be connected such that a mutual movement and non-destructive release is no longer possible, for instance by gluing or welding. An antitwist protection is thus automatically obtained.

The fastening element preferably has an outer profile offering an action surface for an assembly tool.

The object is additionally achieved by an assembly kit for the assembly of valve systems as described above, comprising at least one adapter, at least one fastening element and a tool. The tool and the outer surface of the fastening element are designed such that the tool can interact with the surface of the fastening element, and the joined together valve system is grippable, mountable, releasable and/or fixable with the aid of the tool.

The object is additionally achieved by a method for forming and fitting valve systems, as described above, comprising the steps: joining together of adapter and fastening element, fastening of the joined together valve system with the aid of a tool which interacts with the outer surface of the fastening element and preferably does not interact with the adapter.

The invention is explained in greater detail below in illustrative embodiments with reference to drawings, wherein:

FIG. 1 shows a first example of an inventive valve flap in a first perspective view;

FIG. 2 shows the first inventive valve flap in a second perspective view;

FIG. 3 shows the first inventive valve flap in an axial section;

FIG. 4 shows the first inventive valve flap in a top view;

FIG. 5 shows a schematic representation of the component parts of a first casting machine valve system in perspective view;

FIG. 6 shows a schematic representation of an inventive valve with associated valve flaps;

FIG. 7 shows a schematic representation of valve elements of a second example of an inventive valve in perspective view;

FIG. 8 shows a schematic representation of the component parts of a second example of a casting machine valve system in perspective view;

FIG. 9 shows a schematic representation of the component parts of a further example of a casting machine valve system in perspective view;

FIG. 10 shows a tool and a fastening element in perspective representation;

FIG. 11 shows a schematic representation of the component parts of a further casting machine valve system in perspective view;

FIG. 12 shows a schematic representation of the component parts of the example of a casting machine valve system in perspective view;

FIG. 13 shows a tool and an adapter in perspective representation.

Figure 1:
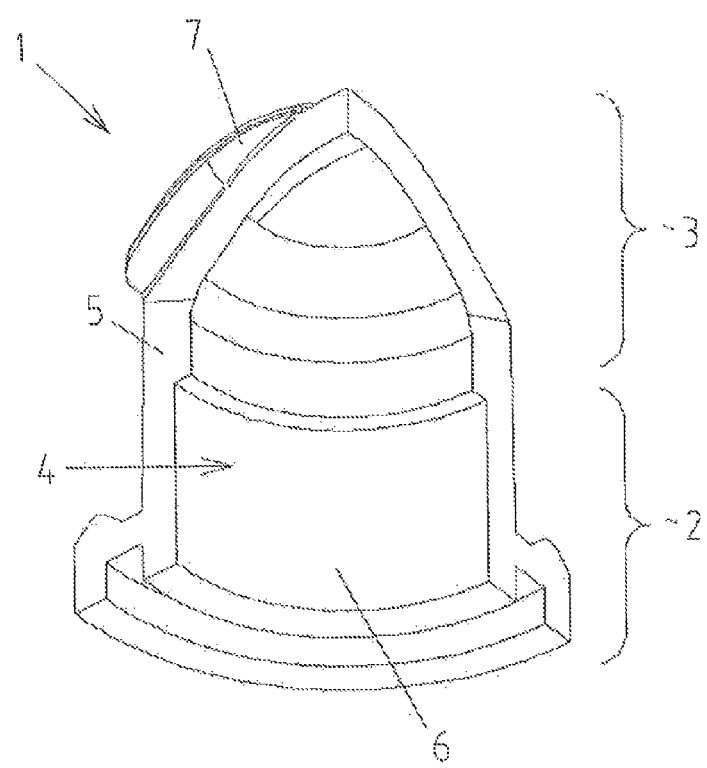
FIG. 1 shows an inventive valve flap 1 in a first perspective view, from inside.

The valve flap 1 possesses a neck region 2 and a flap region 3.

In the neck region 2, the valve flap 1 has a recess 4, in which the material thickness 5 is less. The recess 4 offers a bearing surface 6 for the placement of the valve flap 1 against a socket (not shown in the figure) of an adapter.

In the flap region 3, the valve flap 1 possesses on one side a cutting lip 7.

In the mounted state, this cutting lip 7 overlaps the flap region of an adjacent valve flap (not shown).

Figure 2:
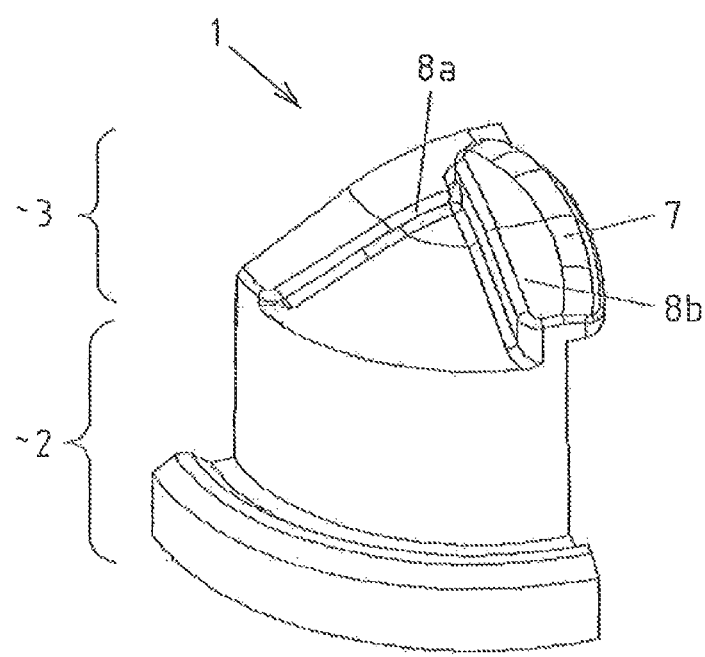

FIG. 2 shows the inventive valve flap 1 in a second perspective view, from outside.

The edges 8a, 8b of the valve flap 1 in the flap region 3 are reinforced, i.e. are realized with a greater material thickness. The reinforcement is designed such that the valve flap 1 provided with a cutting lip 7 does not twist when opened under pressure. Without the compensation by virtue of the reinforcement, that side of the valve flap on which the cutting lip 7 is placed has a higher stiffness than the other side on which no cutting lip is provided. Should opening take place under a uniform internal pressure, the two edges would therefore react differently, which would lead to undesirably strong twisting of the flap.

The edges can be realized such that the mass to be metered receives a preselected spin as it flows through. If the jet of through-flowing mass is intended to be as smooth as possible, the edges are realized such that twisting of the flaps in the course of opening and closing is prevented. If the jet is expected to undergo a torsion, then the flaps are designed such that the opened flaps lead to an outflow that rotates about the outflow axis.

Figure 3:
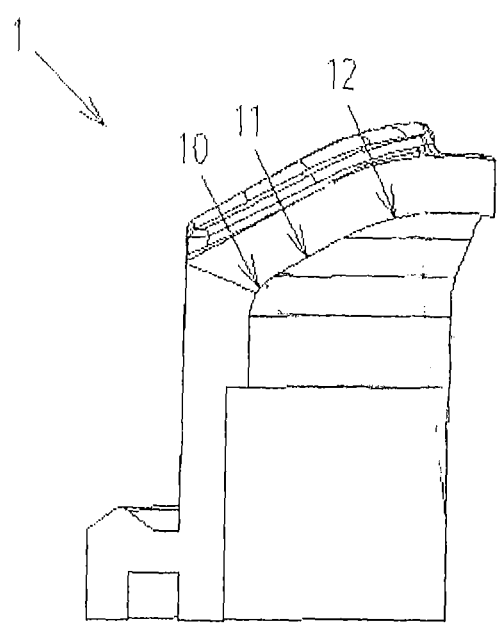

FIG. 3 shows the inventive valve flap 1 in an axial section. The course of the valve flap contour 9, in particular in the flap region 3, is designed such that the bending force, with increasing opening of the valve, is constant. When the mounted valve flaps are opened under pressure, the opening range thus becomes uniformly larger and no sudden leap in the opening range occurs, for instance by a flip of the valve flaps.

In the present illustrative embodiment, the valve flap contour passes from a region 10, curved with a first radius R1, via a substantially straight region 11 (radius close to infinity, or at least very large) into a region 12 curved with a second radius R2, wherein the second radius R2 is larger than the first radius R1.

Figure 4:
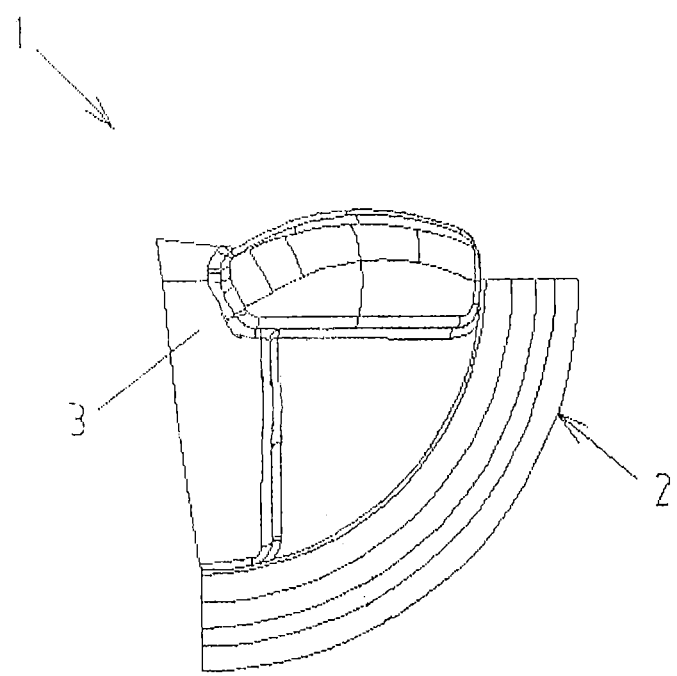

FIG. 4 shows the inventive valve flap 1 in top view.

The valve flap 1 is geometrically overdetermined. In the present case, the flap region 3 covers a larger segment than is enclosed by the neck region 2.

Figure 5:
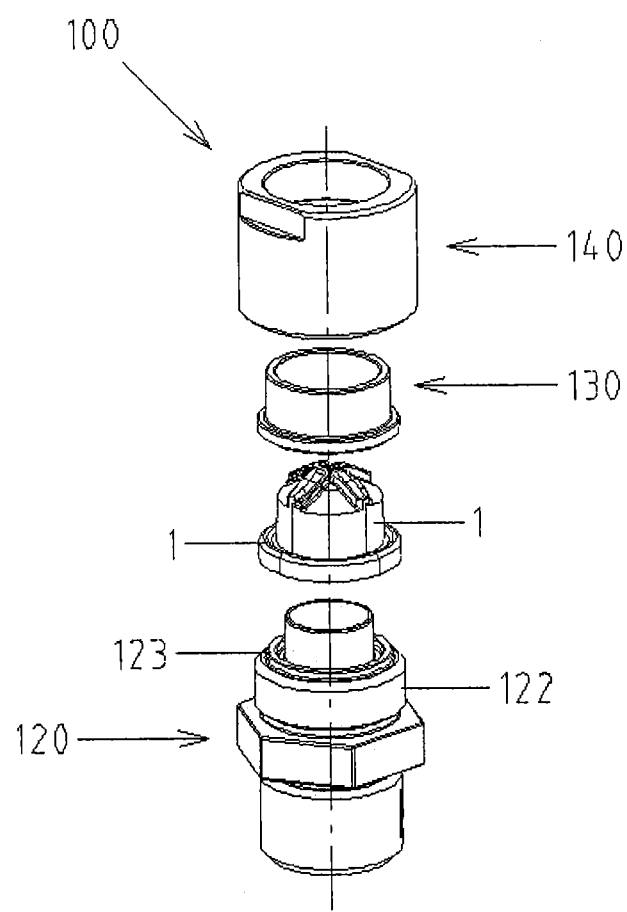

FIG. 5 shows a schematic representation of the component parts of a valve system 110 in perspective view.

The valve system 110 comprises an adapter 120, a valve 100 consisting of four valve flaps 1, an intermediate ring 130, and a fastening element 140 in the form of a coupling nut.

DETAILED DESCRIPTION OF THE INVENTION

The adapter 120 possesses a thread, for fastening the adapter 120 to a structural part (not shown) assigned to the casting machine, and a second thread 122, for the connection to the fastening element 140.

The adapter 120 further comprises a cylindrical socket 123, around which the valve flaps 1 are arranged.

The whole of the adapter 120 is produced from thermally conductive material, here aluminum. The mass to be cast can thus still be temperature controlled in the valve 100. The adapter can alternatively be produced from PE.

According to the flow characteristics of the mass and the spacings of the valves in a casting machine having a multiplicity of valves, the opening diameter measures 5-60 mm, preferably 5-15 mm, preferably around 10 mm.

The valve flaps are produced, for instance, from thermoplastic or thermosetting plastic, or from NBR. Alternatively, according to the field of application, an inner reinforcement can also be provided, for instance an encased metal element or a vulcanized spring steel element.

The intermediate ring is produced as a slide ring, for instance, from POM or from PTFE.

Figure 6:
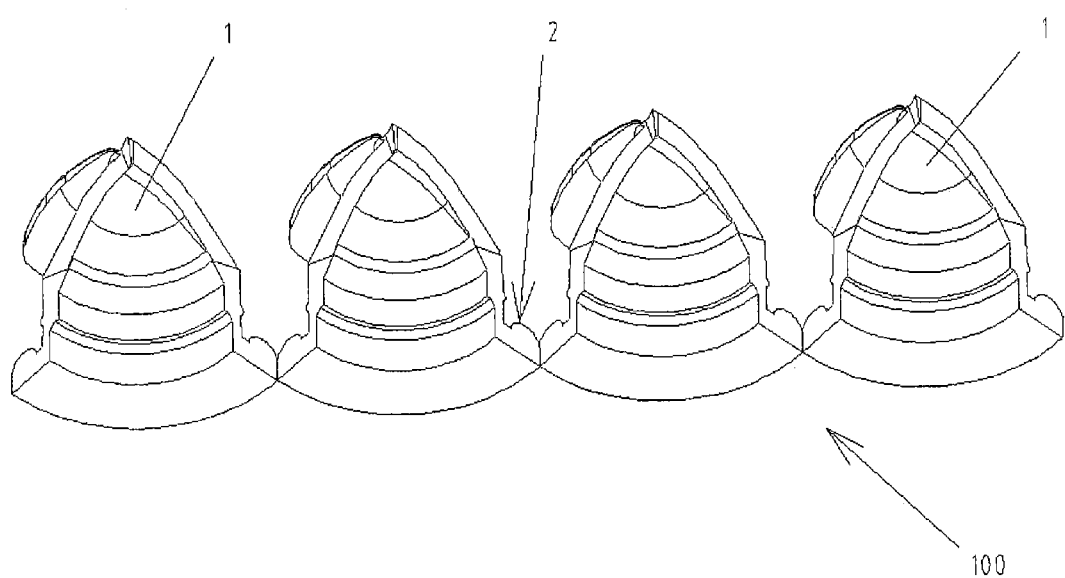

FIG. 6 shows a schematic representation of an inventive valve 100 with associated valve flaps 1. Four similar valve flaps 1 are connected in the neck region 2 such that they are linked together like a band and thus can be easily placed around an adapter (not shown in the figure).

Figure 7:
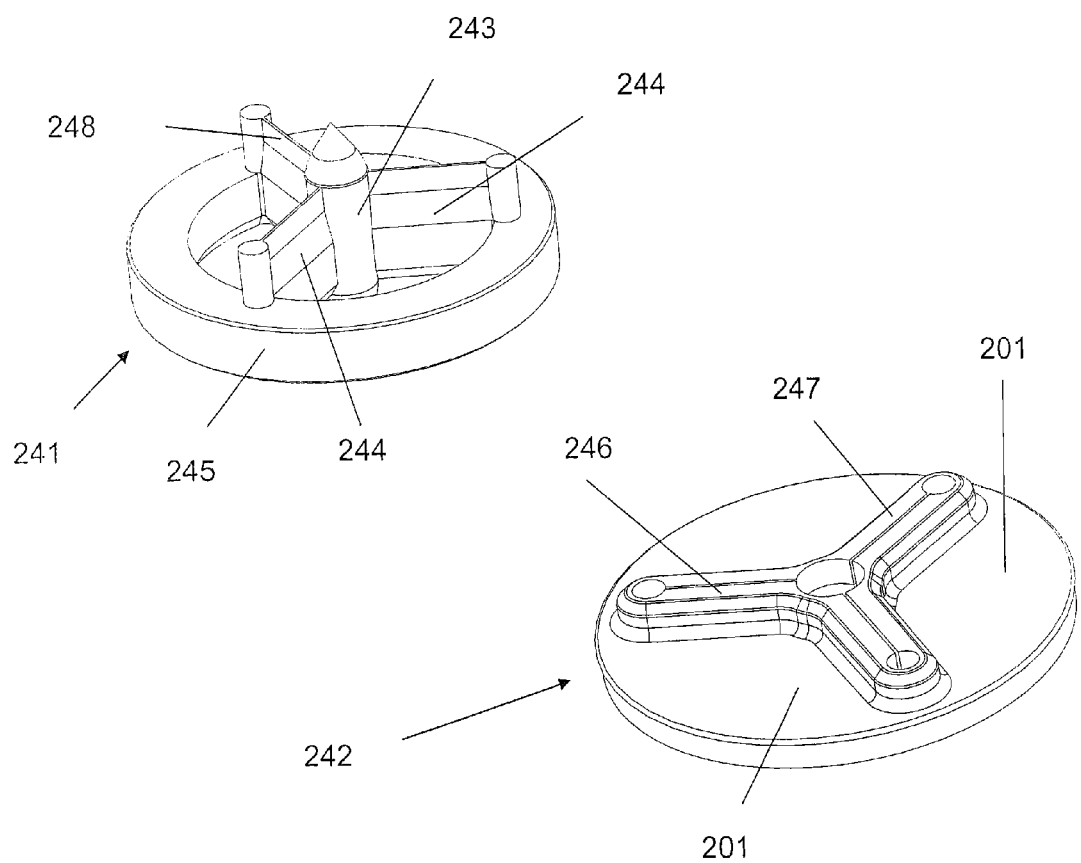

FIG. 7 shows a schematic representation of valve elements 241, 242 of a second example of an inventive valve in perspective view. The valve consists of a supporting element 241, onto which a diaphragm 242 is placed.

The supporting element 241 comprises a centrally arranged spike 243, which is fastened with retaining webs 244 to a holder ring 245.

The diaphragm 242 preferably consists of an elastic material and has slot-like openings 246, so that valve flaps 201, for instance, as here, three flaps, are formed. The slot-like openings 246 can be produced directly in a casting or pressing process or are cut or are punched. In the region of the slot-like openings 246, the diaphragm 242 has a material reinforcement 247, where the layer thickness of the diaphragm 242 is greater. The material reinforcement 247 improves the sealing of the valve flaps 201 with respect to the webs 244 and to the spike 243 and prevents the slot-like openings from being torn out.

In the mounted state, the diaphragm 242 lies on the supporting element 241.

In the example which is shown here, the slot-like openings 246 of the diaphragm correspond with the webs 244. The edges of the valve flaps 201, i.e. the thickened regions on the slot-like openings 247, here butt against the webs 244 and the spike 243. The webs 244 have bearing surfaces 248, against which the edges of the valve flaps bear in the closed state. A sealing closure of the valve is thereby ensured.

The valve opening is blocked by the valve flaps 201, the spike 243 and the webs 244, wherein only the valve flaps are movable when a pressure is applied.

In the mounted state, also in the closed state, the valve flaps 201 are already forced apart somewhat by the spike 243 and the webs 244, hence in the mounted state cover a smaller area than in the unmounted state, and are thus geometrically overdetermined. As a result of being forced apart, the valve flaps 201 undergo a pretensioning.

If a pressure is applied, then the valve flaps 201 are forced away from the spike 243 and the webs 244, the valve opening is at least partially freed and mass can flow out.

The spike 243 and the webs 244 are preferably shaped such that they are flowed around by throughflowing mass, as far as possible under low resistance and/or without turbulence.

If the pressure abates, then the valve flaps 201 come to bear again against the spike 243 and the webs 244, so that the valve opening is closed off and there is no longer an afterdrip of mass.

In the closed state, the tight valve closure is produced by the abutment of a fixed and a movable element, since the flaps 201 bear against a web 244 or the spike 243. At least the fixed elements barely suffer wear, so that a longlife valve is created.

Alternatively, instead of the slotted diaphragm 242, individual flaps, as described above, could also be arranged around a spike, so that the valve closure is formed by mutually abutting flap edges and by contact of the flap tips with the spike. The retaining webs for the spike then need no bearing surface.

Figure 8:
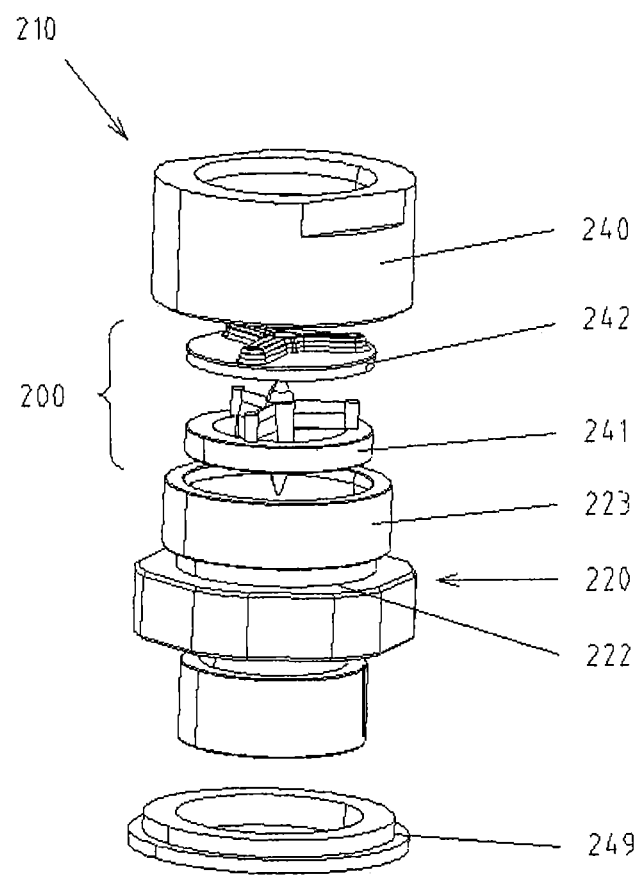

FIG. 8 shows a schematic representation of the component parts of a second example of a casting machine valve system 210 in perspective view.

The valve system 210 comprises an adapter 220, a valve 200, consisting of a supporting element 241 and a diaphragm 242, and a fastening element 240, which is clipped onto the adapter 220.

In addition, the adapter 220 comprises a cylindrical socket 223, in which the valve 210 can be inserted.

The fastening between the adapter 220 and the casting machine can be sealed with a sealing ring 249.

Figure 9:
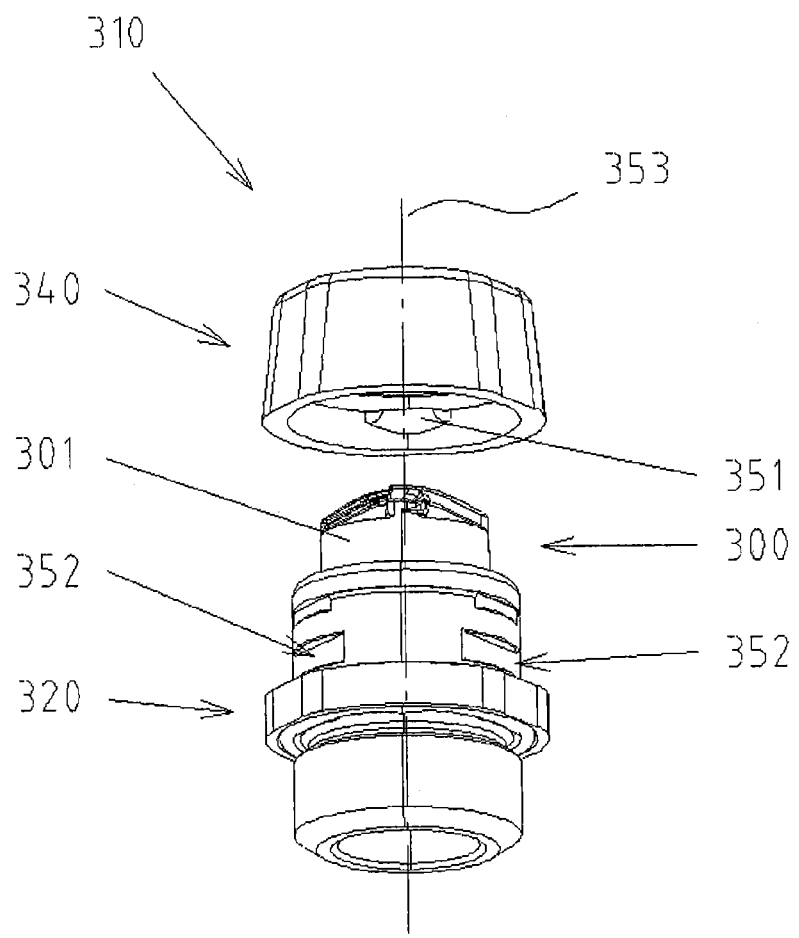

FIG. 9 shows a schematic representation of the component parts of a second example of a casting machine valve system 310 in perspective view.

The valve system 310 comprises an adapter 320, a valve 300, consisting of a plurality of valve flaps 301, and a fastening element 340, which is clipped onto the adapter 320.

The fastening element 340, which is produced, for instance, from a plastic, possesses on its inner side a clip 351, which, in the mounted state, engages in a corresponding recess 352 on the outer side of the adapter 320. The clip 351 and the recess 352 are realized such that the once mounted fastening element 340 can no longer be removed from the adapter in a non-destructive manner, or at least without a tool, nor can it be twisted against said adapter. In the present example, the clips 351 and the recesses 352 possess faces which are arranged tangentially to the longitudinal axis 353 of the valve system 310 and which prevent twisting of the mounted fastening element 340 against the adapter 320.

Figure 10:
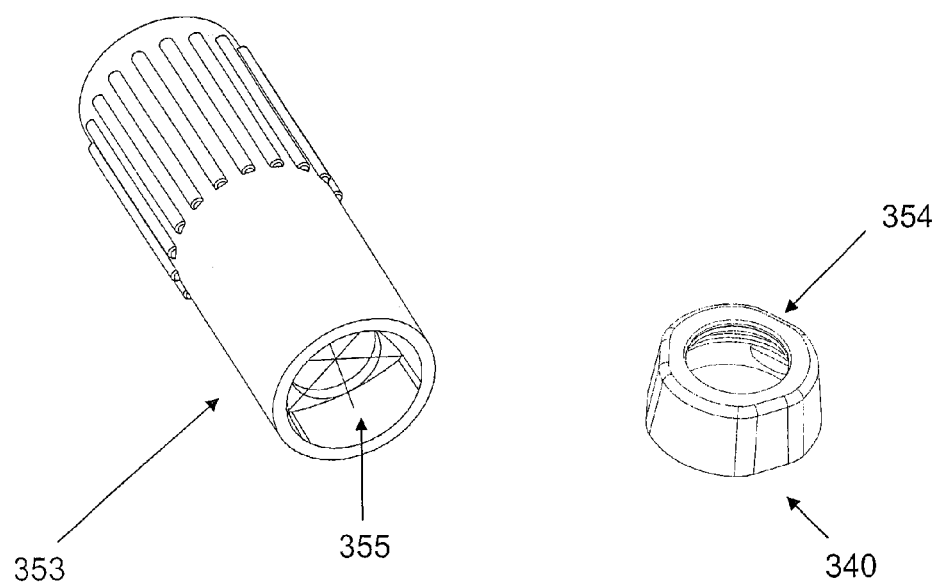

FIG. 10 shows a tool 353 and a fastening element 340.

The fastening element 340 possesses a profiled outer surface 354, in the shown example an outer profile of three-part symmetry, on which the tool 353 can engage. To this end, the tool 353 has an inner contour 355 which fits onto the outer profile 354 of the fastening element 340. With the aid of the tool 353, the complete, joined together valve system 310 can be attached, removed, fastened or released, in particular fastened to a casting machine or released from this.

The adapter 320 is produced, for instance, from aluminum and can be screwed to an appropriate structural part of a casting machine.

Figure 11:
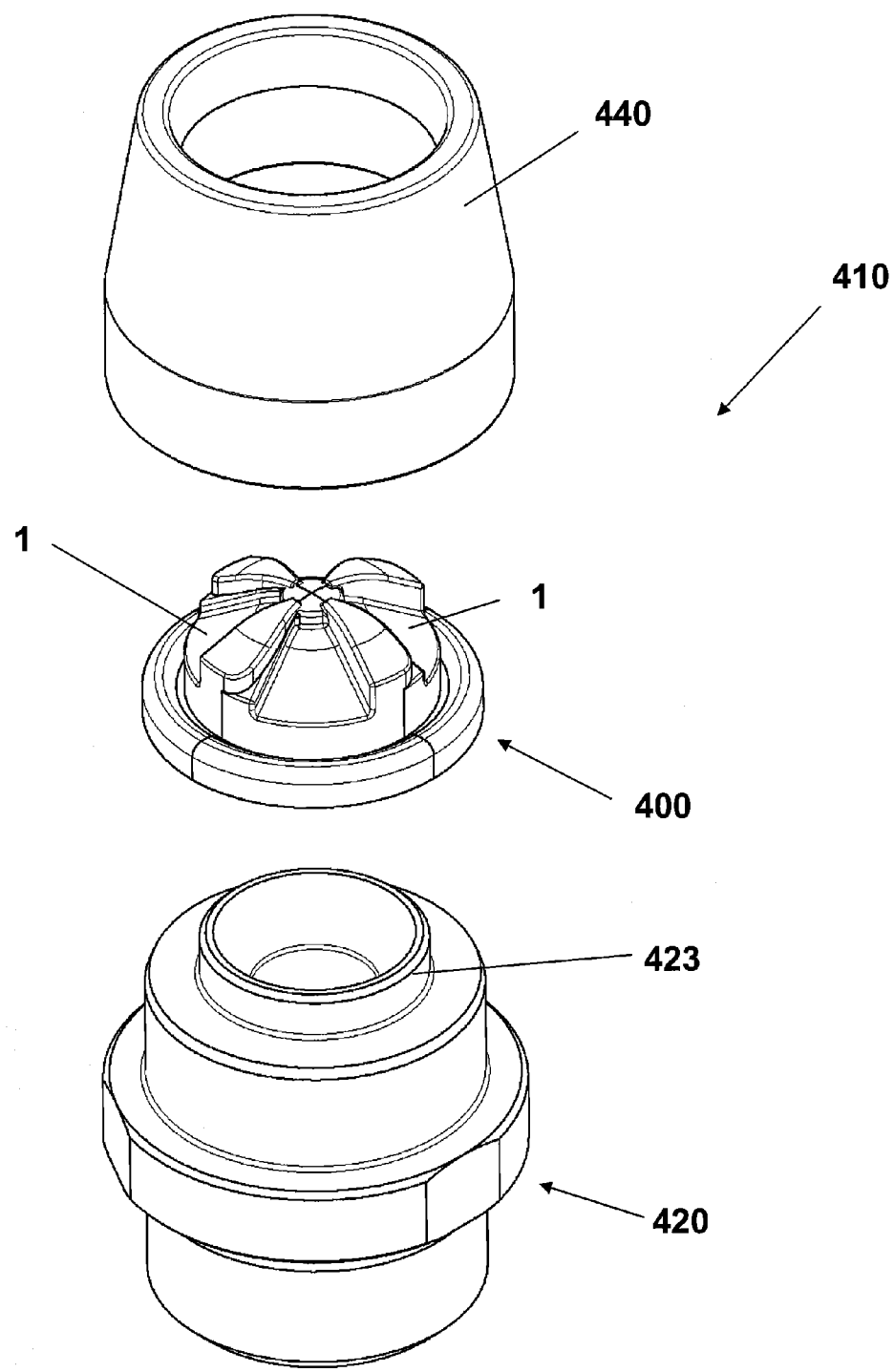

FIG. 11 shows a schematic representation of the component parts of a further example of a valve system 410 in perspective view.

The valve system 410 comprises an adapter 420, a valve 400, consisting of four valve flaps 1, and a fastening element 440 in the form of a coupling part.

The fastening element 440 and the adapter 420 are joined with a press fit.

The valve flaps 1 are produced, for instance, from a thermoplastic polyurethane (TPU). They contain iron oxide particles and are thus detectable in a metal detector.

Figure 12:
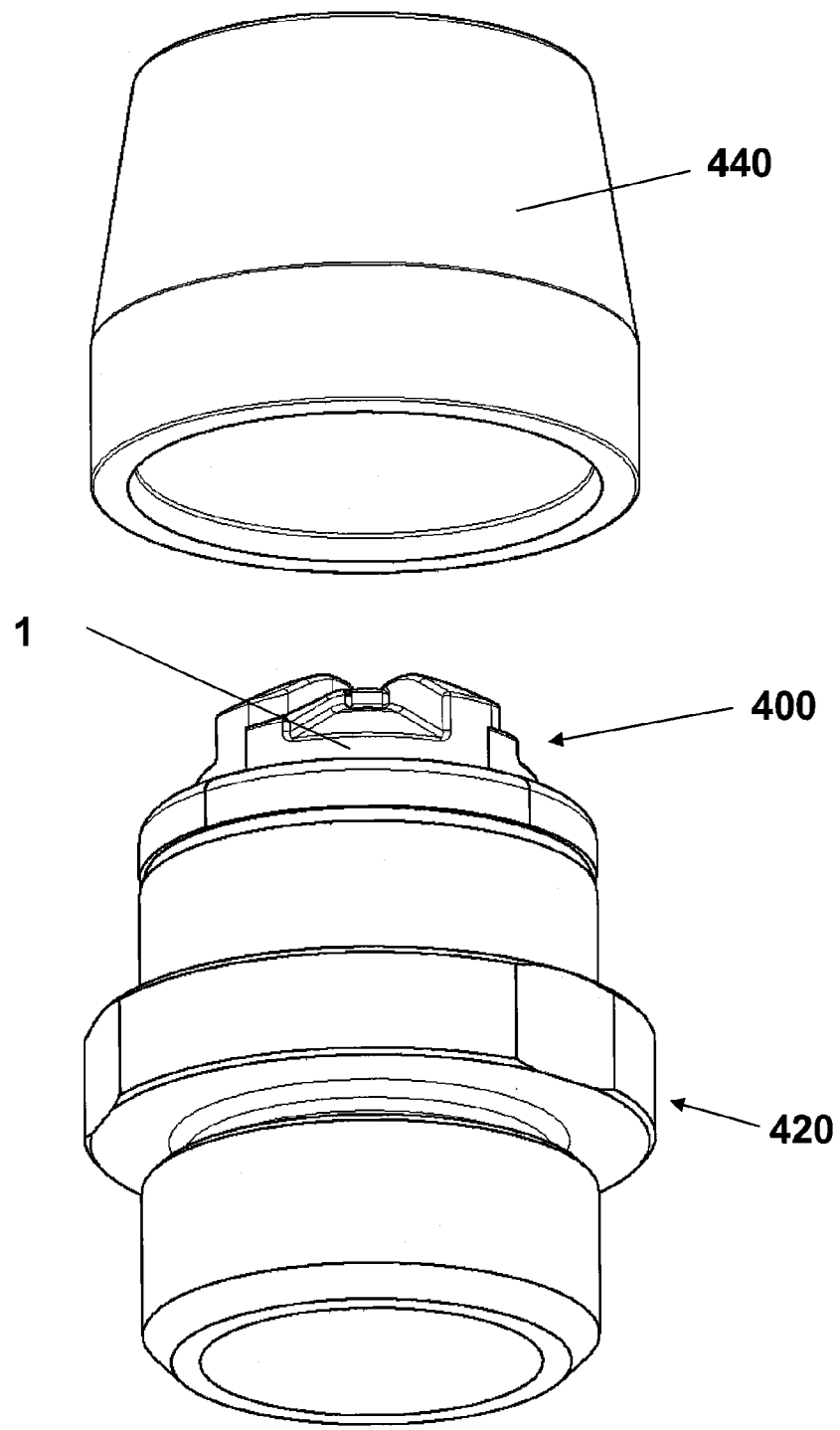

In addition, the adapter 420 further comprises a cylindrical neck 423, around which are arranged the valve flaps 1, as is shown in FIG. 12.

Figure 13:
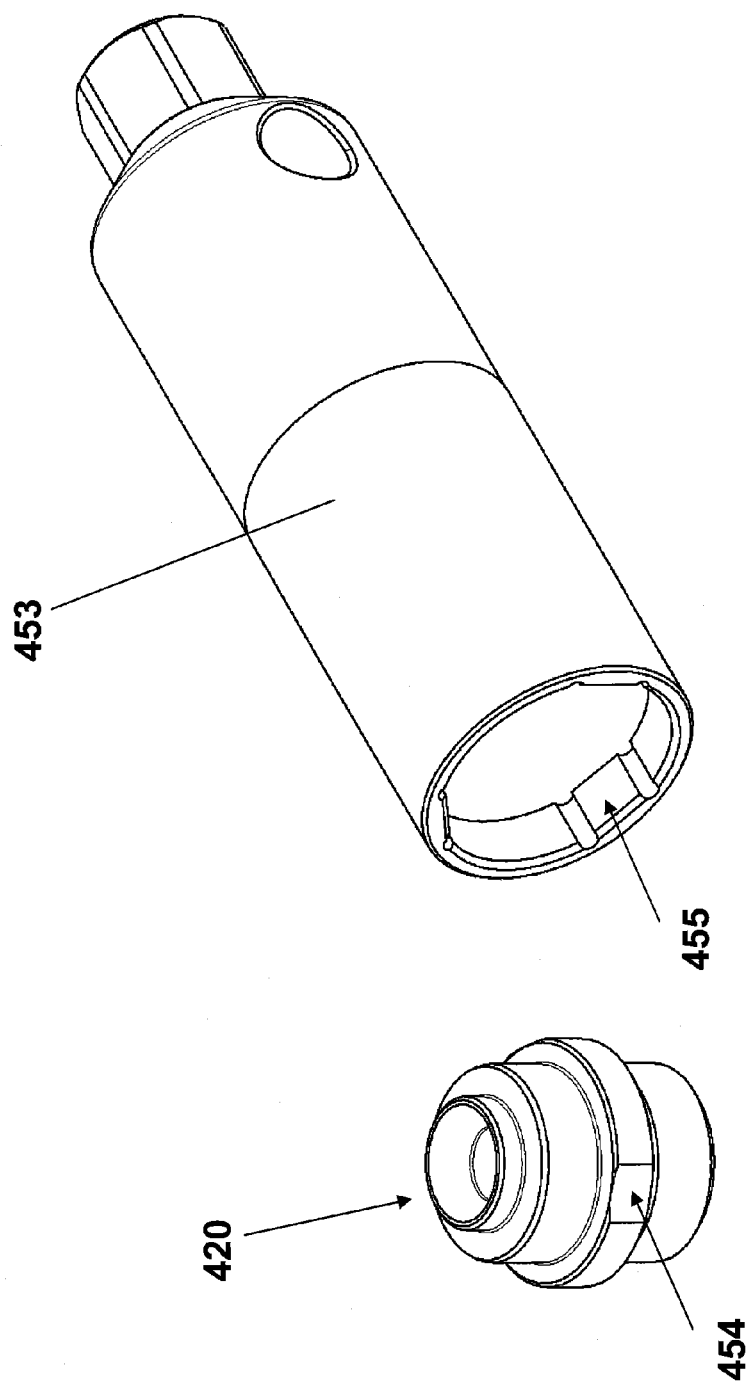

FIG. 13 shows a tool 453 and an adapter 420.

The adapter 420 possesses a profiled outer surface 454, in the shown example an outer profile of three-part symmetry, on which the tool 453 can engage. To this end, the tool 453 has an inner contour 455 which fits onto the outer profile 454 of the adapter 420. With the aid of the tool 453, the adapter 420 or the complete, joined together valve system 410 can be attached, removed, fastened or released, in particular fastened to a casting machine or released from this.

The invention claimed is:

1. A valve for installation in a casting machine, wherein the valve comprises at least two similar valve flaps, which are geometrically overdetermined and/or which have at least one cutting lip which in the mounted state, with the valve closed, overlaps or underlays an adjacent valve flap.

2. The valve as claimed in claim 1, wherein the valve flap has at least one flap region.

3. The valve as claimed in claim 1, wherein the valve flaps have a neck region.

4. The valve as claimed in claim 1, wherein the valve flaps have at least one flap region and the flap region is geometrically overdetermined.

5. The valve as claimed in claim 1, wherein the valve flaps have at least one flap region and the valve flaps have at least one cutting lip in the flap region.

6. The valve as claimed in claim 1, wherein the valve flaps are realized at the marginal regions such that they fit, in the mounted state, sealingly onto adjacent valve flaps.

7. The valve as claimed in claim 6, wherein the valve flaps have a neck region and the valve flaps are realized at the marginal regions such that at their neck region, they fit positively onto or into adjacent valve flaps.

8. The valve as claimed in claim 1, wherein at least one of
the edges (8a, 8b) of the valve flap are reinforced,
the valve flap contour is designed such that the bending force as the flaps are opened is constant and/or the valve flap (1) opens under pressure across the entire width,
the valve flap is designed such that a mass which flows through the mounted valve flap receives a spin.

9. The valve as claimed in claim 1, wherein the valve flaps are designed such that a mass which flows through the mounted valve flap receives a spin.

10. A valve system having a valve as claimed in claim 1, wherein the valve system has an adapter and a fastening element.

11. The valve system as claimed in claim 10, wherein the fastening element is a coupling nut, a clamping or a clip element.

12. The valve system as claimed in claim 10, wherein the system has an intermediate ring, by which the valve flaps are held together.

13. The valve system as claimed in claim 12, wherein the intermediate ring is disposed between the valve flaps and the fastening element.

14. The valve system as claimed claim 10, wherein the adapter has at least one socket made of thermally conductive material, around which valve flaps can be arranged.

15. The valve system as claimed in claim 10, wherein the valve system has an adapter and a fastening element for receiving a valve and an antitwist protection is provided on at least one of the adapter and the fastening element, such that the fastening element can no longer be twisted in relation to the adapter as soon as the fastening element is mounted on the adapter.

16. A casting machine having a valve as claimed in claim 1.

17. A casting machine having a valve system as claimed in claim 10.

18. A method for forming a valve system as claimed in claim 10, comprising steps of:
arranging at least one valve comprising a valve flap, the valve flap being designed such that, with at least one further valve element a valve can be formed and the valve flap having a neck region and the valve flap being geometrically overdetermined in the flap region, on an adapter; and
fixing of the arrangement with a fastening element.

19. A method for adapting a valve system as claimed in claim 10 to a mass to be cast, comprising steps of:
releasing the fastening element,
removing the valve,
selecting suitable valve flaps, and
forming a valve system as claimed in claim 18.

20. An assembly kit for forming a valve system as claimed in claim 18, comprising
an adapter,
a fastening element and
a multiplicity of different valve flaps, each valve flap being designed such that, with at least one further valve element a valve can be formed, at least two valve flaps are selected from the multiplicity of different valve flaps, which at least two valve flaps together form a valve suitable for a predefined mass that is to be cast.

21. A method for converting a casting machine, comprising the steps:
    removal of an old casting machine valve,
    at least one of fitting of casting machine valves as claimed in claim 1 and
    fitting of casting machine valve systems comprising an adapter and a fastening element.

22. An assembly kit for the assembly of valve systems as claimed in claim 15, comprising
    at least one adapter,
    at least one fastening element and
    a tool,
    wherein the tool and the outer surface of the fastening element are designed such that the tool can interact with the surface of the fastening element, and the joined together valve system is at least one of grippable, mountable, releasable and fixable with the aid of the tool.

23. A method for forming and fitting valve systems as claimed in claim 15, comprising the steps:
    joining together of adapter and fastening element;
    fastening of the joined together valve system with the aid of a tool which interacts with the outer surface of the fastening element (140; 240; 340; 440).

24. The method as claimed in claim 23, wherein
    the tool does not interact with the adapter.

* * * * *